(12) United States Patent
Zoch et al.

(10) Patent No.: US 9,541,332 B2
(45) Date of Patent: Jan. 10, 2017

(54) DUAL-DIRECTIONAL COOLER

(75) Inventors: Dawn M. Zoch, Eagan, MN (US); Charles E. Edwards, Cornelius, NC (US); Michael J. Gross, Cleveland, NC (US); Darrell A. Stock, Huntersville, NC (US); Noel H. Davis, Davidson, NC (US); Willie D. Valentine, Statesville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 1227 days.

(21) Appl. No.: 12/990,223

(22) PCT Filed: Apr. 30, 2009

(86) PCT No.: PCT/US2009/042347
§ 371 (c)(1),
(2), (4) Date: Feb. 9, 2011

(87) PCT Pub. No.: WO2009/135025
PCT Pub. Date: Nov. 5, 2009

(65) Prior Publication Data
US 2011/0120686 A1    May 26, 2011

Related U.S. Application Data

(60) Provisional application No. 61/049,272, filed on Apr. 30, 2008.

(51) Int. Cl.
*F28F 9/02* (2006.01)
*F28D 7/10* (2006.01)
*F28D 7/16* (2006.01)

(52) U.S. Cl.
CPC ............. *F28D 7/16* (2013.01); *F28D 7/1607* (2013.01); *F28D 7/1638* (2013.01); *B01D 2257/80* (2013.01); *F28F 2280/02* (2013.01)

(58) Field of Classification Search
CPC ............. F28D 7/06; F28D 9/04; F28F 9/0219; F28F 9/22; F28F 7/02
(Continued)

(56) References Cited

U.S. PATENT DOCUMENTS 2,292,524 A    8/1942    Jacocks
2,460,499 A    2/1949    Grace
(Continued)

FOREIGN PATENT DOCUMENTS

CN    2555491    6/2003
DE    1149368 B    5/1963
(Continued)

OTHER PUBLICATIONS

Office Action from the State Intellectual Property Office of the People's Republic of China for Application No. 200980126139.8 dated Nov. 9, 2012 (English Translation and Original, 36 pages).

*Primary Examiner* — Justin Jonaitis
*Assistant Examiner* — Claire Rojohn, III
(74) *Attorney, Agent, or Firm* — Taft Stettinius & Hollister LLP (57) ABSTRACT

A heat exchanger for use in cooling a flow of compressed gas with a flow of cooling fluid includes a body portion having a first end, a second end, and a space between the first end and the second end. A tube bundle includes a first tube sheet, a second tube sheet, and a plurality of tubes extending between the first tube sheet and the second tube sheet. The tube bundle is insertable into the space from either the first end or the second end. A first head includes an inlet and an outlet, the first head connected to the first end and connectable to the second end and a second head is connected to the second end and connectable to the first end such that cooling fluid enters the inlet, passes through a portion of the plurality
(Continued)

of tubes, contacts the second head and flows through a second portion of the plurality of tubes to the outlet.

23 Claims, 9 Drawing Sheets

(58) Field of Classification Search
USPC ............... 165/157, 158, 164, 165, 173, 175
See application file for complete search history.

(56) References Cited

U.S. PATENT DOCUMENTS

| | | | |
|---|---|---|---|
| 2,691,508 A | | 10/1954 | Hatfield |
| 2,738,659 A | | 3/1956 | Heed |
| 3,031,131 A | | 4/1962 | Hildebrandt |
| 3,179,092 A | | 4/1965 | Haring |
| 3,326,279 A | * | 6/1967 | Eisberg et al. ............... 165/133 |
| 3,593,782 A | | 7/1971 | Draves et al. |
| 3,669,185 A | * | 6/1972 | Bare ....................... F28F 9/013 |
| | | | 165/158 |
| 3,804,161 A | * | 4/1974 | Nowak ..................... F28F 9/00 |
| | | | 165/158 |
| 3,822,741 A | * | 7/1974 | Lippitsch ................. F28F 9/00 |
| | | | 165/158 |
| 4,589,478 A | | 5/1986 | Wunder |
| 4,698,982 A | | 10/1987 | Laios et al. |
| 4,714,107 A | | 12/1987 | Adsett |
| 4,871,014 A | * | 10/1989 | Sulzberger ................ F17D 5/04 |
| | | | 165/158 |
| 5,004,042 A | * | 4/1991 | McMorries, IV ...... F01P 3/207 |
| | | | 123/41.01 |
| 6,206,086 B1 | * | 3/2001 | McKey ........................... 165/76 |
| 6,679,689 B2 | | 1/2004 | Takahashi et al. |
| 6,899,169 B1 | * | 5/2005 | Cox .............................. 165/159 |
| 7,377,039 B2 | | 5/2008 | Al-Anizi et al. |
| 2003/0131977 A1 | * | 7/2003 | West ..................... F28D 7/1676 |
| | | | 165/159 |
| 2003/0196781 A1 | * | 10/2003 | Wanni ....................... F28D 7/16 |
| | | | 165/82 |
| 2003/0218333 A1 | * | 11/2003 | Barber ..................... F28F 9/16 |
| | | | 285/124.1 |
| 2004/0238161 A1 | * | 12/2004 | Al-Anizi ............... F28D 7/1607 |
| | | | 165/134.1 |
| 2004/0256088 A1 | * | 12/2004 | Ayub ..................... F25B 39/02 |
| | | | 165/132 |
| 2005/0067153 A1 | * | 3/2005 | Wu ............................ F28D 7/16 |
| | | | 165/158 |
| 2006/0266504 A1 | * | 11/2006 | Rohrbaugh et al. .......... 165/158 |

FOREIGN PATENT DOCUMENTS

| | | |
|---|---|---|
| FR | 973724 A | 2/1951 |
| GB | 367979 A | 3/1932 |
| JP | 11002496 A | 1/1999 |

* cited by examiner

DUAL-DIRECTIONAL COOLER

RELATED APPLICATIONS

This patent application claims priority to U.S. Provisional Patent Application Ser. No. 61/049,272 filed Apr. 30, 2008, the entire contents of which are hereby incorporated by reference.

BACKGROUND

The invention relates to a cooler for a compressor system. In particular, the invention relates to a cooler for a compressor system arranged to facilitate efficient maintenance.

SUMMARY

In one embodiment, the invention provides a compressor system that includes a heat exchanger with a first head, an enclosure, and a tube bundle. The heat exchanger facilitates convenient installation and site modification within the compressor system.

In another construction, the invention provides a heat exchanger for use in cooling a flow of compressed gas with a flow of cooling fluid. The heat exchanger includes a body portion having a first end, a second end, and a space between the first end and the second end. A tube bundle includes a first tube sheet, a second tube sheet, and a plurality of tubes extending between the first tube sheet and the second tube sheet. The tube bundle is insertable into the space from either the first end or the second end. A first head includes an inlet and an outlet, the first head connected to the first end and connectable to the second end and a second head is connected to the second end and connectable to the first end such that cooling fluid enters the inlet, passes through a portion of the plurality of tubes, contacts the second head and flows through a second portion of the plurality of tubes to the outlet.

In yet another construction, the invention provides a heat exchanger for use in cooling a flow of compressed gas with a flow of cooling fluid. The heat exchanger includes a body portion having a first end, a second end, and a space between the first end and the second end. The body portion defines a first axial length between the first end and the second end. A tube bundle includes a first tube sheet, a second tube sheet, and a plurality of tubes extending between the first tube sheet and the second tube sheet. The tube bundle defines a second axial length between the first tube sheet and the second tube sheet. The second axial length is greater than the first axial length. A first head is connected to the first tube sheet to define a first seal therebetween and is connected to the body portion to define a second seal therebetween. A second head is connected to the second tube sheet to define a third seal therebetween and is connected to the body portion to define a fourth seal therebetween. The first head and the second head cooperate to completely support the tube bundle within the space.

In another construction, the invention provides a heat exchanger for use in cooling a flow of compressed gas with a flow of cooling fluid. The heat exchanger includes a body portion having a first end, a second end, and a space between the first end and the second end. A tube bundle includes a first tube sheet, a second tube sheet, and a plurality of tubes extending between the first tube sheet and the second tube sheet. The tube bundle is positioned within the space. A first head includes an inlet and an outlet. The first head is connected to the first end and a divider is coupled to the first head and cooperates with the first head and the first tube sheet to enclose an inlet space and an outlet space. The inlet space provides fluid communication between the inlet and a first portion of the plurality of tubes, and the outlet space provides fluid communication between the outlet and a second portion of the plurality of tubes. A second head is connected to the second end. The second head cooperates with the second tube sheet to define a head space that provides fluid communication between the first plurality of tubes and the second plurality of tubes.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
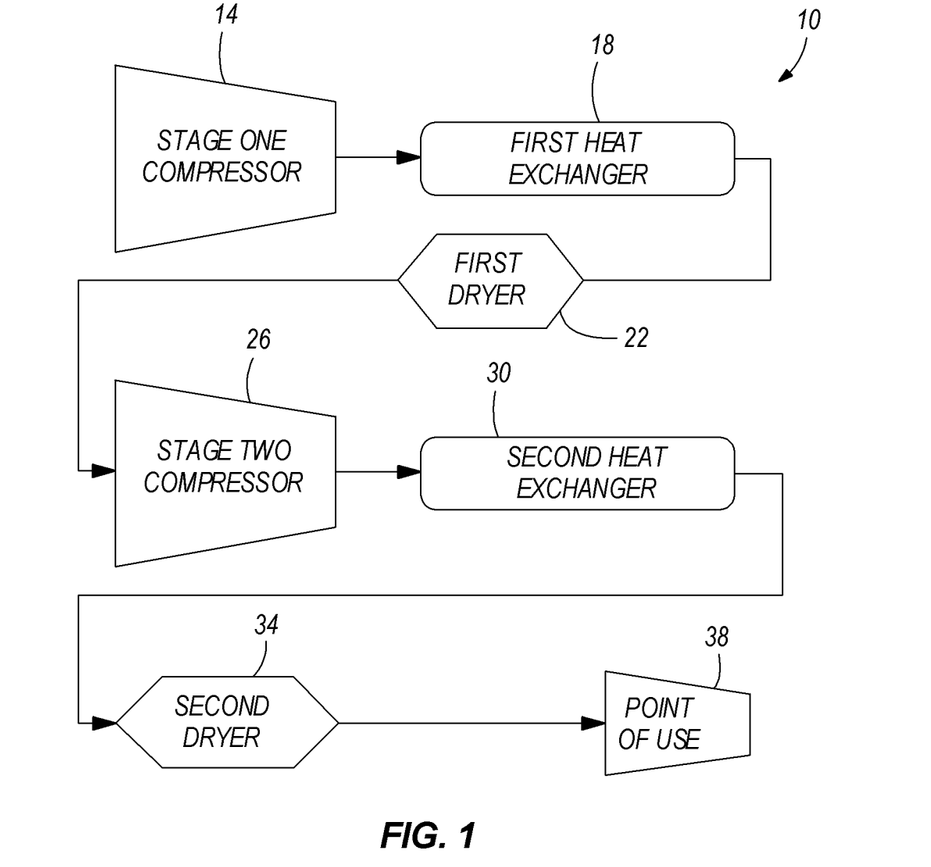
FIG. 1 is a schematic of a compressor system.

FIG. 1 schematically illustrates a compressor system 10 that defines a fluid circuit and includes a first compressor 14, a first heat exchanger 18, a first dryer 22, a second compressor 26, a second heat exchanger 30, a second dryer 34, and a point of use 38. In the illustrated construction, the compressor system 10 is an air-compressor system for the production of compressed air. In other constructions, other fluids may be compressed, as desired. In addition, the compressor system 10 may include more or less compressors, heat exchangers, and/or dryers, as desired. Furthermore, other components (e.g., valves, reservoirs, filters, coolers, heaters, pressure regulators, etc.) may be added or eliminated.

The illustrated first and second compressors 14, 26 in the circuit are preferably rotary compressors (e.g., screw or scroll compressors) that compress air. Air enters the first compressor 14, is compressed, and is discharged from the first compressor 14. The discharged air passes through the first heat exchanger 18 to cool the air from a first temperature to a second temperature. Following the first heat exchanger 18, the air is dried by the first dryer 22. After the air is cooled and dried, it is compressed further by the second compressor 26. The air discharged from the second compressor 26 is cooled by the second heat exchanger 30, dried by the second dryer 34, and flows to the point of use 38. In other constructions, the compressor system 10 may include other types of compressors (e.g., centrifugal, reciprocating, etc.) or other types of dryers. As will become clear, the actual arrangement of the compressor system 10 is not critical to the function of the invention.

Figure 2:
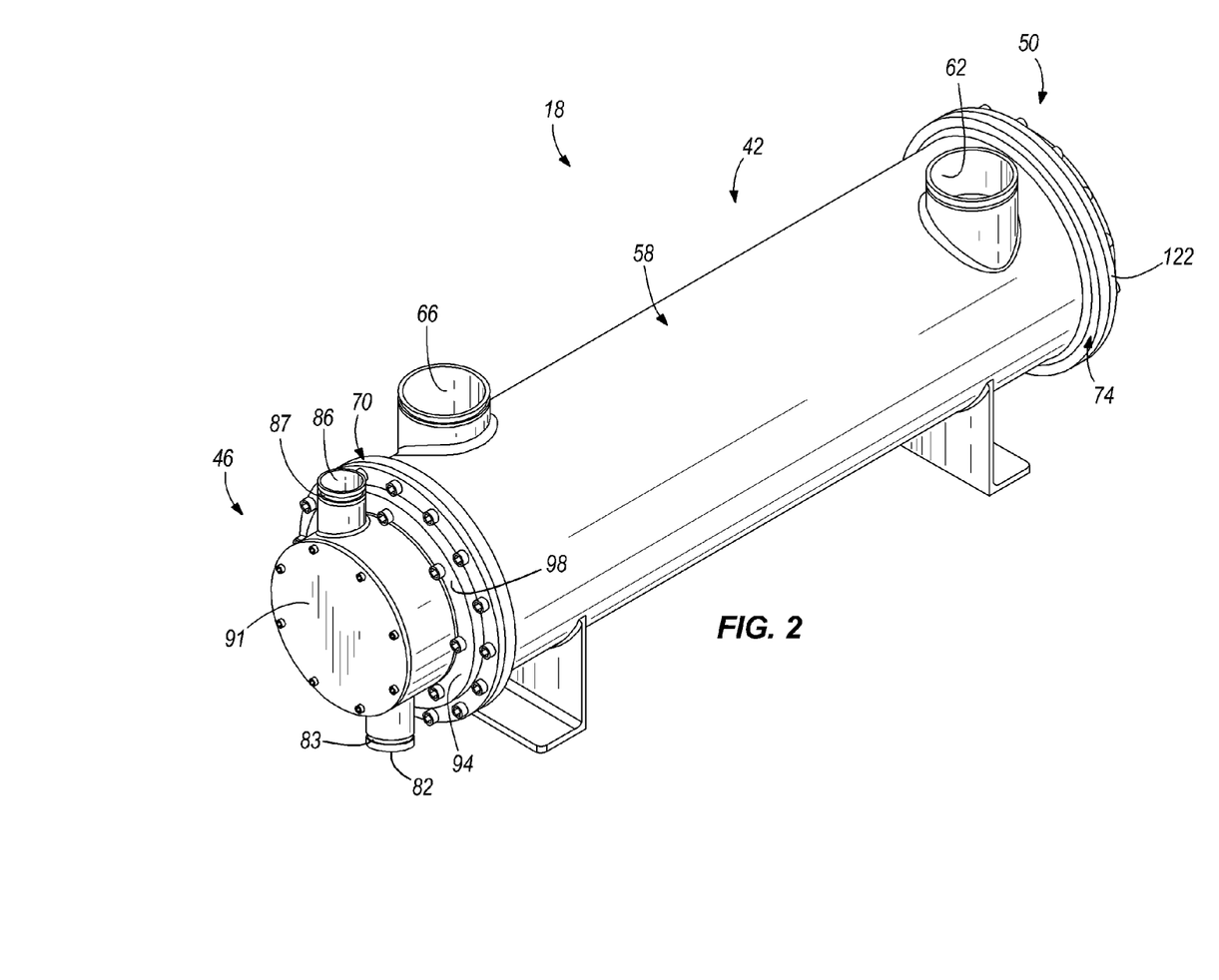
FIG. 2 is a perspective view of a heat exchanger of the compressor system of FIG. 1.

The illustrated first heat exchanger 18 and second heat exchanger 30 are similarly arranged but may be sized differently based on desired temperature change, flow rates, density of the compressed fluid, or other factors. With reference to FIG. 2, the first heat exchanger 18 will be described in detail. However, the following description also applies to the second heat exchanger 30.

Figure 4:
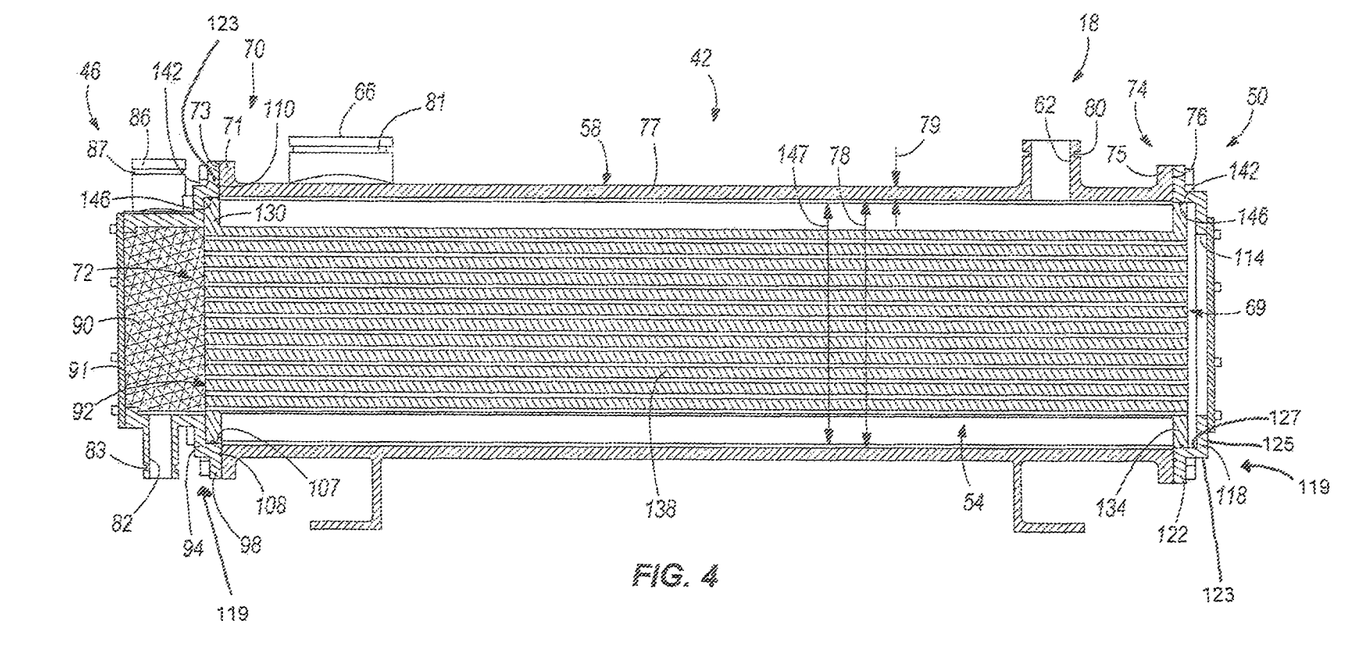
FIG. 4 is a section view of the heat exchanger of FIG. 2 taken along line 4-4 of FIG. 3.
Figure 5:
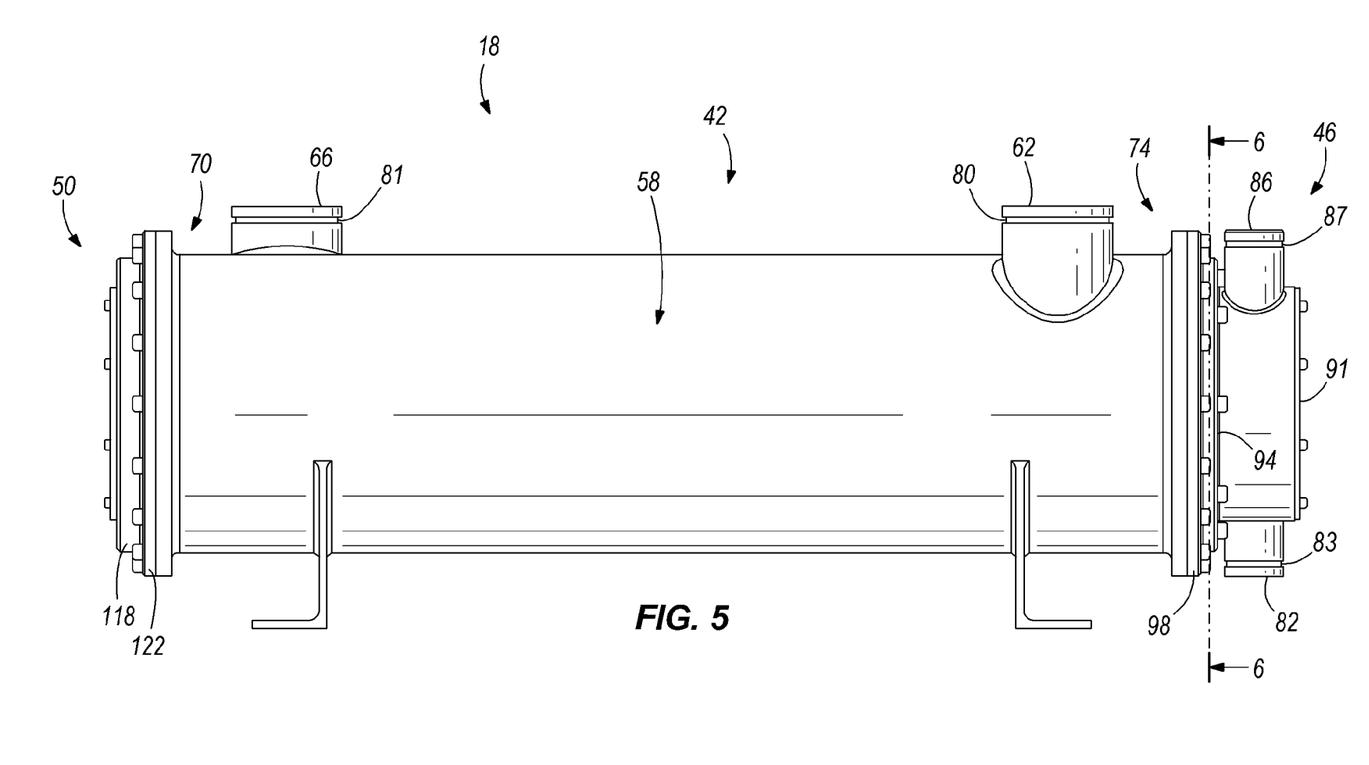
FIG. 5 is a front view of the heat exchanger of FIG. 2.

The heat exchanger 18 includes an enclosure 42, a first head 46, a second head 50, and a tube bundle 54 (see FIG. 4). As can be seen, the arrangement of the heat exchanger 18 is similar to a shell-and-tube heat exchanger and is well suited for use as, for example, an air-cooler. However, in other constructions, the heat exchanger 18 may be employed to cool or heat other fluids.

With reference to FIG. 4, the illustrated enclosure 42 includes a body portion 58, a cooling inlet 62, a cooling outlet 66, a first flanged end 70, and a second flanged end 74. The body portion 58 includes a substantially cylindrical wall 77 that defines a substantially constant internal dimension 78 and a substantially constant thickness 79. In the illustrated construction, the body portion 58 is cylindrical and the internal dimension 78 is a diameter of the body portion 58. In other constructions, the body portion 58 may be an oval, a square, or have another shape.

The cooling inlet 62 is formed as a part of the enclosure 42 and projects from the body portion 58. The illustrated cooling inlet 62, includes a recess 80 that receives an o-ring (not shown) for sealing with a supply tube (not shown) that supplies air to be cooled to the heat exchanger 18.

Figure 7:
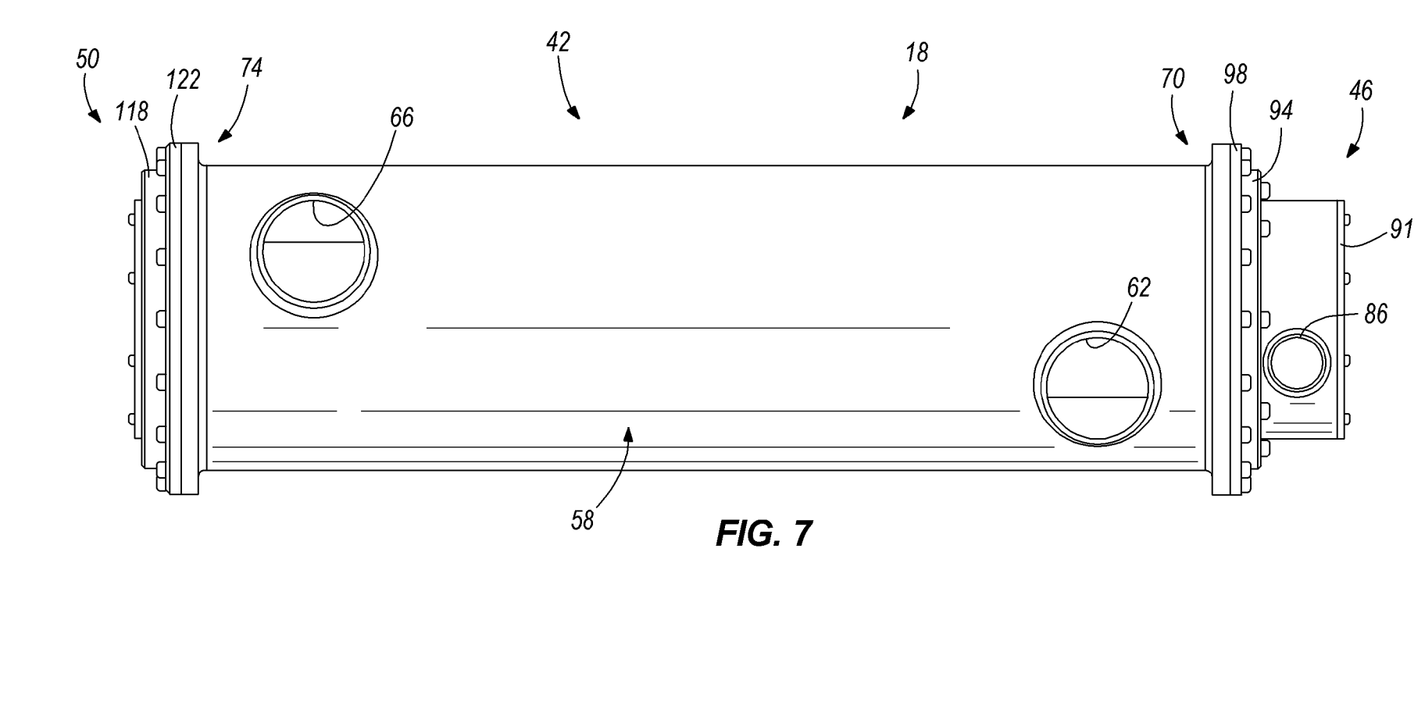
FIG. 7 is a top view of the heat exchanger of FIG. 2.

The cooling outlet 66 is similar to the cooling inlet 62 and is also formed as a part of the enclosure 42. The illustrated cooling outlet 66 includes a recess 81 that receives an o-ring (not shown) for sealing with a return tube (not shown) that returns cooled air from the heat exchanger 18 to the compressor system 10. Referring to FIG. 7, the illustrated cooling inlet 62 and the cooling outlet 66 are staggered from each other with respect to a centerline of the heat exchanger 18. Both the cooling inlet 62 and the cooling outlet 66 form fluid seals (e.g., air seals) that substantially inhibit fluid from leaking out of the seal formed between the cooling inlet 62 and cooling outlet 66 and the supply tube and return tube, respectively. In other constructions, the cooling inlet and outlet 62, 66 may have flanged ends, flared ends, or another coupling arrangement such that the heat exchanger 18 is substantially hermetically coupled to the supply and return tubes. In addition, the o-rings may be eliminated and/or replaced with gaskets or other seal, as desired such that a substantially air-tight connection is made. In still other embodiments, the cooling inlet and outlet 62, 66 may be a fluid seal that inhibits fluid leakage. For example, the supply and return tubes may supply and return water, respectively, without substantial leakage.

With continued reference to FIG. 4, the illustrated first flanged end 70 is positioned at one end of the cylindrical wall 77 and defines a first annular flange 71 extending radially from the body portion 58 and a first end opening 72. The first annular flange 71 includes a substantially planar first mating surface 73 that directly couples to the first head 46 with fasteners.

The illustrated second flanged end 74 is positioned at the end opposite the first flanged end 70 and defines a substantially planar second annular flange 75 extending radially from the body portion 58 and a second end opening 69. The second annular flange 75 includes a second mating surface 76 that directly couples to the second head 50 with fasteners.

The illustrated first head 46 includes an inlet 82, an outlet 86, a divider 90 (see FIG. 3), a sheet portion 94, and a mating portion 98. When attached to the enclosure 42, the first head 46 substantially encloses the first end opening 72 of the enclosure 42.

Figure 3:
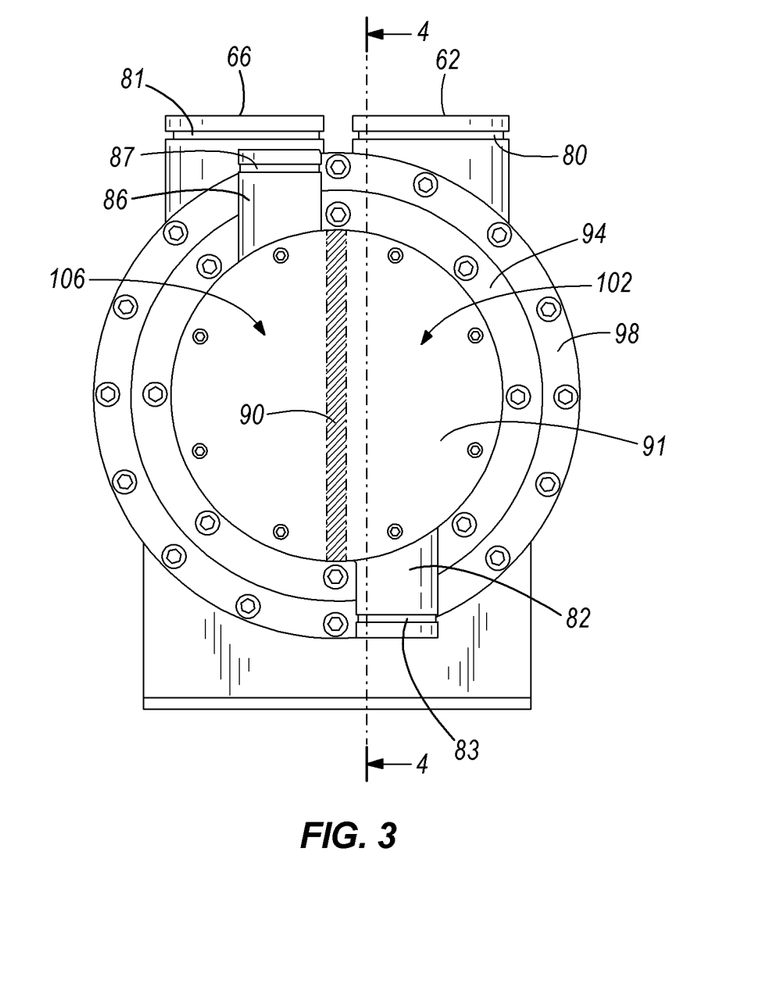
FIG. 3 is a left side view of the heat exchanger of FIG. 2.

The illustrated inlet 82 is formed as a part of the first head 46 and projects therefrom. The illustrated inlet 82, includes a recess 83 that receives an o-ring (not shown) for sealing with a supply tube (not shown) that supplies cooling fluid (e.g., water, glycol, etc.) to the heat exchanger 18.

The illustrated outlet 86 is similar to the inlet 82 and is also formed as a part of the first head 46. The illustrated outlet 86 includes a recess 87 that receives an o-ring (not shown) for sealing with a return tube (not shown) that discharges cooling fluid from the heat exchanger 18. Both the inlet 82 and the outlet 86 form fluid seals that substantially inhibit cooling fluid from leaking out of the seal formed between the inlet 82 and outlet 86 and the supply tube and return tube, respectively. In other constructions, the inlet and outlet 82, 86 may have flanged ends, flared ends, or another coupling arrangement such that the heat exchanger 18 is coupled to the supply and return tubes in an arrangement that inhibits leakage. In addition, the o-rings may be eliminated and/or replaced with gaskets or other seals, as desired.

With reference to FIGS. 3 and 4, the illustrated divider 90 is formed as a part of the first head 46 between the inlet 82 and the outlet 86. The divider 90 extends axially from an outer wall 91 of the first head 46 to a sheet plane 92 such that an inlet chamber 102 is formed between the inlet 82, the first head 46, the outer wall 91, the divider 90, and the sheet plane 92 to provide a space for cooling fluid to collect after entering the heat exchanger 18. An outlet chamber 106 is formed between the outlet 86, the first head 46, the outer wall 91, the divider 90, and the sheet plane 92 to provide a space for the cooling fluid to collect before being discharged from the heat exchanger 18 through the outlet 86. The divider 90 substantially inhibits fluid flow from the inlet chamber 102 to the outlet chamber 106. In other constructions, the divider 90 may have a different arrangement, as desired. For example, the divider 90 may be a separate piece from the first head 46 or may be an elastic diaphragm among other arrangements that could effectively inhibit flow from the inlet 82 to the outlet 86.

The illustrated sheet portion 94 is formed as a part of the first head 46 and provides a sealing portion 107 where the first head 46 sealingly engages the tube bundle 54. The sealing portion 107 also includes a surface that coincides with the sheet plane 92.

The illustrated mating portion 98 includes a flange that mates with the first flange end 70 of the enclosure 42. The mating portion 98 also includes a recess 108 that receives an o-ring 110 that substantially seals the connection between the mating portion 98 and the first flange end 70. In other constructions, the mating portion 98 may have other arrangements and sealing structure, as desired. For example, the recess 108 and o-ring 110 may be eliminated and/or replaced with a gasket, adhesive, or other seal type. In addition, although the mating portion 98 is illustrated with the recess 108 and o-ring 110, clearly, the first flange end 70 could include a similar recess and o-ring or other sealing structure. Furthermore, the illustrated mating portion 98 includes a plurality of apertures sized to receive bolts. The bolts facilitate the attachment of the first head 46 to the first flange end 70. Alternatively, other fastener types are considered (e.g., band clamps) and may be utilized, as desired.

With continued reference to FIG. 4, the illustrated second head 50 defines a return space 114 and includes a sheet portion 118 and a mating portion 122. The sheet portion 118 and mating portion 122 of the second head 50 are substantially the same as the sheet portion 94 and mating portion 98 of the first head 46. When attached to the enclosure 42, the second head 50 substantially encloses the second end opening 69 of the enclosure 42. Additionally, the second flanged end 74 of the enclosure 42 is similar to the first flanged end 70 such that the first head 46 and second head 50 can be mounted on either the first flanged end 70 or the second flanged end 74, interchangeably. The heads 46, 50 include a flange 119 with a circumferential rim 123 positioned between the outwardly extending mating portion 122 and an inwardly extending portion 125. A recess 127 is formed with the flange 119 for a portion of the tube sheets 130, 134 to engage therewith.

Figure 8:
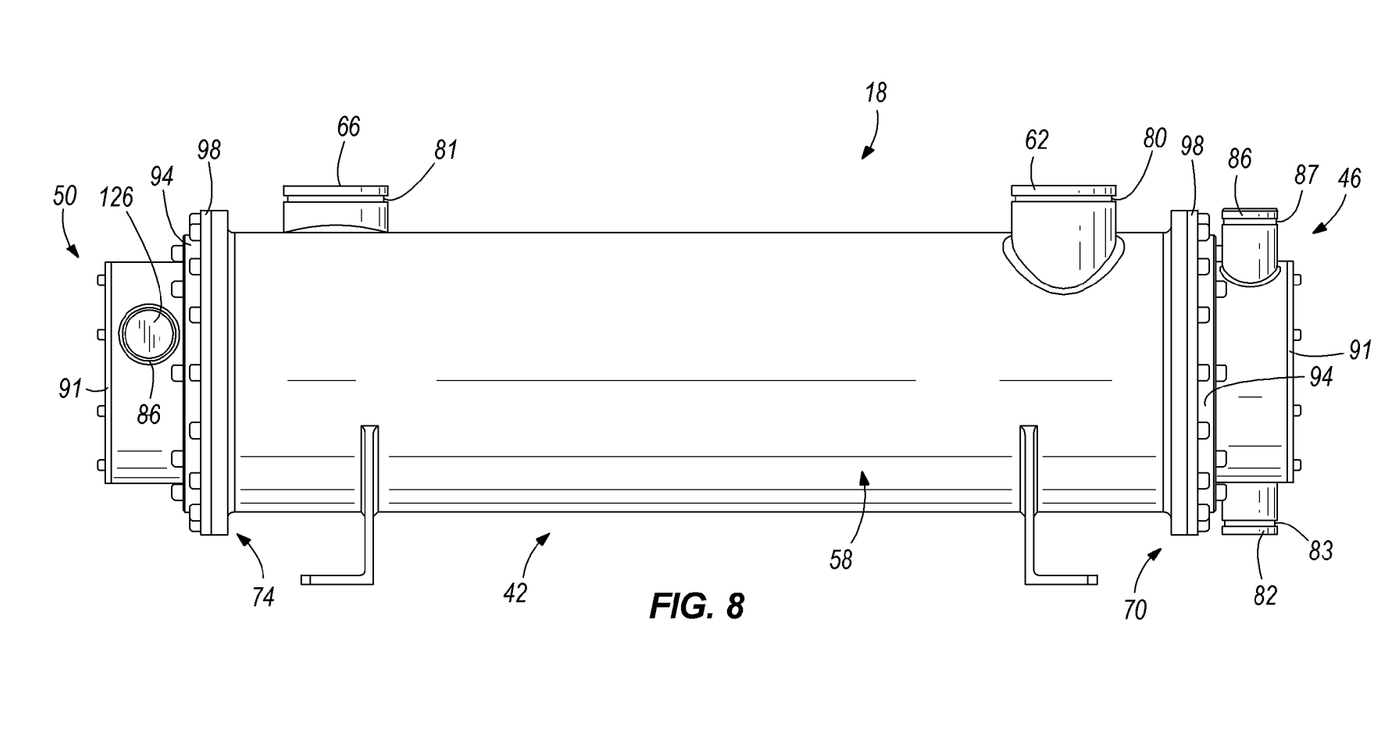
FIG. 8 is a front view of another heat exchanger of the compressor system of FIG. 1.

In the embodiment shown in FIG. 8, the second head 50 is the same as the first head 46 and includes two plugs 126 (only one is visible) seated in the inlet 82 and outlet 86 to inhibit flow therethrough. The second head 50 is coupled to the second flange end 70 at ninety degree angle with respect to the first head 46 such that the divider 90 of the second head 50 does not interfere with fluid flow. In other constructions, a different angle with respect to the first head 46 may be appropriate. In addition, the first and second heads 46, 50 may be formed from one or more pieces, as desired. In one construction, the inlet 82 and outlet 86 of the second head 50 are flanged and a blind flange cap is secured to inhibit flow through the inlet 82 and outlet 86. In other constructions, other plugs or seals may be used, as desired.

As shown in FIG. 4, the tube bundle 54 includes a first tube sheet 130, a second tube sheet 134, and a compliment of tubes 138. The illustrated first tube sheet 130 is a cylindrical disc that defines a planar circular area 139 (see FIG. 6) that coincides with the sheet plane 92 and includes a sealing portion 142 with a seal 146. The sealing portion 142 engages the sheet portion 94 of the first head 46 and is held thereto by fasteners. In addition, the first tube sheet 130 is sealed against the divider 90 of the first head 46 such that fluid is inhibited from flowing between the inlet chamber 102 and the outlet chamber 106 through the seal formed between the divider 90 and the first tube sheet 130. In the illustrated construction, the seal 146 is an o-ring. In other constructions, different seals could be used (e.g., a gasket) or more seals could be utilized. In addition, the sheet portion 94 may include the seal 146, or the seal 146 could be eliminated, as desired. The second tube sheet 134 is substantially the same as the first tube sheet 130 and includes the same features.

The first and second tube sheets 130, 134 have an outer dimension 147 that is slightly less than the inner dimension 78 of the body portion 58 such that the tube bundle 54 may be inserted through the enclosure 42 from either the first flange end 70 or the second flange end 74. The sheet portions 94, 118 of the first and second heads 46, 50, respectively, sealingly engage the tube bundle 54.

Figure 6:
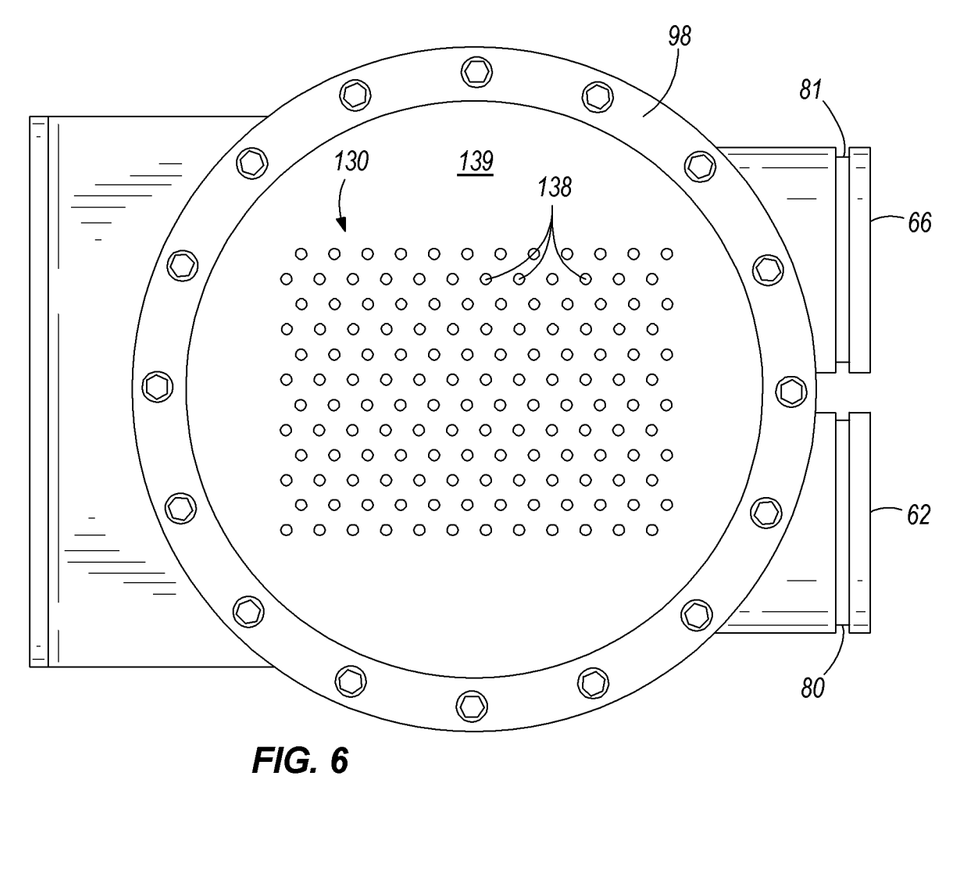
FIG. 6 is a section view of the heat exchanger of FIG. 2 taken along line 6-6 of FIG. 5.

The compliment of tubes 138 runs between the first and second tube sheets 130, 134 and each tube is a hollow cylinder that is directly connected to both the first tube sheet 130 and the second tube sheet 134. As shown in FIG. 6, in the illustrated construction, the tubes 138 are formed in a grid pattern by a drilling process. In other constructions, the tubes 138 may be formed by a rolling process or another process, as desired. In addition, the tubes 138 may be formed as a part of the first and second tube sheets 130, 134 or may be formed separately and directly connected to the first and second tube sheets 130, 134 via welding, adhesives, soldering, or another process. The tubes 138, the first tube sheet 130, and the second tube sheet 134 provide a closed fluid pathway between the first head 46 and the second head 50 such that cooling fluid leakage into the enclosure 42 is inhibited.

The tubes 138 may include fins or other protrusions to enhance the heat transfer or may be smooth. The tubes 138 may be shaped differently (e.g., square or elliptical) or may be arranged in a different configuration than illustrated, as desired.

Figure 9:
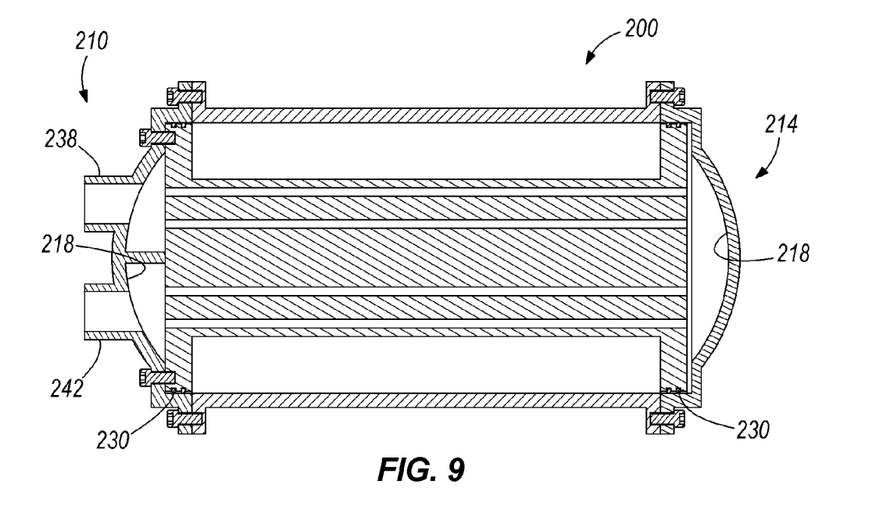
FIG. 9 is a section view of another heat exchanger of the compressor system of FIG. 1.
Figure 10:
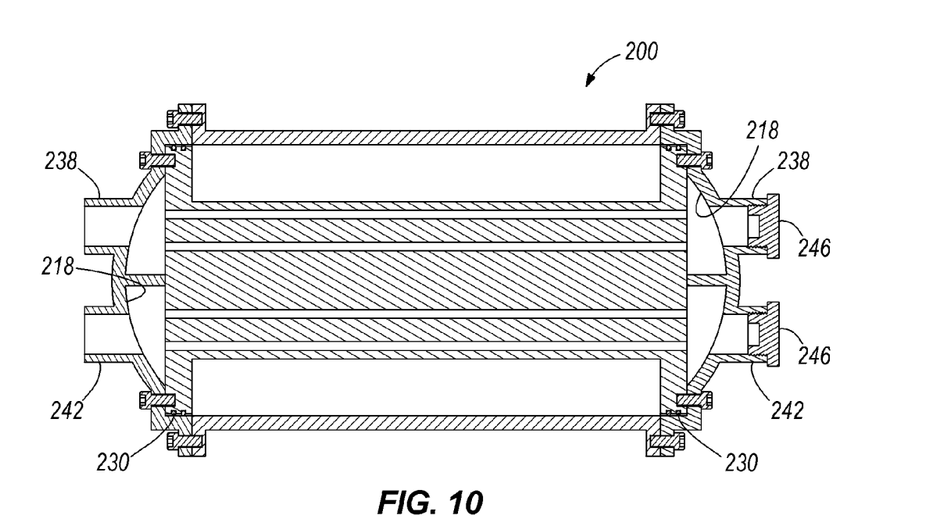
FIG. 10 is a section view of another heat exchanger of the compressor system of FIG. 1.

With reference to FIGS. 9 and 10, another construction of the invention is shown wherein a heat exchanger 200 is similar to the heat exchanger 18. The heat exchanger 200 differs from the heat exchanger 18 in that the first and second heads 210, 214 include a dome shaped cavity 218 and the tube sheets 222, 226 each include a sealing portion 230 with two seals 234. The first head 210 includes an inlet 238 and an outlet 242 that project axially away from the heat exchanger 200 as opposed to the inlet 82 and outlet 86 of the heat exchanger 18 that project substantially transverse to the axial direction of the heat exchanger 18. The construction shown in FIG. 10 is similar to the construction shown in FIG. 8 and includes a second head 214 that is substantially the same as the first head 210 and includes plugs 246 or stops to inhibit flow through an inlet 238 and an outlet 242.

In operation, the heat exchanger 18 is mounted within the compressor system 10 with the first and second heads 46, 50 arranged on either the first or second flanged end 70, 74 of the enclosure 42 such that the supply and return tubes may be positioned on either end of the heat exchanger 18, as desired, and installation into the compressor system 10 is facilitated and future maintenance or site modification may be enabled. In addition, the tube bundle 54 may be inserted into the enclosure 42 from either the first or second end opening 72, 69 to facilitate installation and cleaning operations.

The heat exchanger 18 then operates in the compressor system 10 to cool fluid within the compression circuit. While cooling, the fluid (e.g., air) passes through the cooling inlet 62, over the tube bundle 54, and out the cooling outlet 66. As the fluid is passing through the heat exchanger 18, cooling fluid passes through the inlet 82, through the tube bundle 54 within the body portion 58 of the enclosure 42, and out the outlet 86. The heat is transferred between the fluid and the cooling fluid through the tubes 138.

When the heat exchanger 18 is cleaned, the first and/or second head 46, 50 is removed from the heat exchanger 18 such that access to the tube bundle 54 is provided. Then, the tube bundle 54 may be removed through either the first or second end opening 72, 69 for a cleaning procedure. Alternatively, the tube bundle 54 may be cleaned while in place within the enclosure 42 from either the first or second end opening 72, 69. The tube bundle 54 may be removed through either the first end opening 72 or the second end opening 69 to facilitate removal from the enclosure 42 depending on the arrangement of the heat exchanger 18 within the compressor system 10.

Another advantage provided by the invention is the ability to maintain all fluid connections in place during a cleaning operation. The inlet 82, outlet 86, cooling inlet 62, and cooling outlet 66 may all remain connected to respective pipes or tubes while a user removes the first and/or second head 46, 50 to perform a cleaning operation.

After the heat exchanger 18 is cleaned, the tube bundle 54 is replaced within the enclosure 42 and the first and/or second heads 46, 50 replaced. The heat exchanger 18 then operates within the compressor system 10 until the next cleaning.

Other arrangements of heat exchangers may be practiced with the invention, as desired. For example, a finned heat exchanger may be used. In addition, the fluid and cooling fluid may be different than illustrated. Furthermore, the second head 50 may be eliminated and the second flanged end 74 of the enclosure 42 may be sealed to provide the return space 114.

What is claimed is:

1. A heat exchanger for use in cooling a flow of compressed gas with a flow of cooling fluid, the heat exchanger comprising:
   a body portion having a first end, a second end, and a space between the first end and the second end, the space defining a minimum space diameter;
   a tube bundle including a first tube sheet, a second tube sheet, and a plurality of tubes extending between the first tube sheet and the second tube sheet, the first tube sheet and the second tube sheet positioned at opposing ends of the plurality of tubes to define a maximum tube bundle diameter that is less than the minimum space diameter such that either end of the tube bundle is insertable into the space from either the first end or the second end of the body portion;
   a first head including an inlet and an outlet, the first head removably connected with a fastener to the first end and connectable to the second end;
   a second head removably connected with a fastener to the second end and connectable to the first end such that cooling fluid enters the inlet, passes through a portion of the plurality of tubes, contacts the second head and flows through a second portion of the plurality of tubes to the outlet;
   wherein the body portion defines a first length between the first end and the second end, and the tube bundle defines a second length between the first tube sheet and the second tube sheet, the second length being greater than the first length; and wherein the first head and the second head completely support the tube bundle within the space;
   wherein the first head and the second head completely support the tube bundle within the space such that the tube bundle is held in position without contact of the body portion; and
   wherein all portions of the first and second heads are positioned external to the body portion.

2. The heat exchanger of claim 1, wherein the body portion includes a uniform inside diameter that extends from the first end to the second end.

3. The heat exchanger of claim 1, further comprising a first seal member positioned between the first tube sheet and the first head to define a first radial seal therebetween and a second seal member positioned between the second tube sheet and the second head to define a second radial seal therebetween.

4. The heat exchanger of claim 1, wherein the body portion defines a longitudinal axis and wherein the first head is attachable to the body portion at a plurality of different orientations with respect to the longitudinal axis.

5. The heat exchanger of claim 1, further comprising a divider coupled to the first head and cooperating with the first head and the first tube sheet to enclose an inlet space and an outlet space, the inlet space providing fluid communication between the inlet and a first portion of the plurality of tubes, and the outlet space providing fluid communication between the outlet and a second portion of the plurality of tubes.

6. The heat exchanger of claim 5, wherein the second head cooperates with the second tube sheet to define a head space that provides fluid communication between the first plurality of tubes and the second plurality of tubes.

7. A heat exchanger for use in cooling a flow of compressed gas with a flow of cooling fluid, the heat exchanger comprising:
   a body portion having a first end, a second end, and a space between the first end and the second end, the body portion defining a first axial length between the first end and the second end;
   a tube bundle including a first tube sheet, a second tube sheet, and a plurality of tubes extending between the first tube sheet and the second tube sheet positioned at opposing ends thereof, the tube bundle defining a second axial length between the first tube sheet and the second tube sheet, the second axial length being greater than the first axial length, the tube bundle being removable from either end of the body portion;
   a first head removably connected with a fastener to the first tube sheet to define a first seal therebetween and connected to the body portion to define a second seal therebetween, wherein one of the first seal and the second seal is a radial seal;
   a second head removably connected with a fastener to the second tube sheet to define a third seal therebetween and connected to the body portion to define a fourth seal therebetween, wherein one of the third seal and the fourth seal is a radial seal, and wherein the first head and the second head cooperate to completely support the tube bundle within the space;
   wherein the first head and the second head completely support the tube bundle within the space such that the tube bundle is held in position without contact of the body portion; and
   wherein all portions of the first and second heads are positioned external to the body portion.

8. The heat exchanger of claim 7, wherein the tube bundle is insertable into the space from either the first end or the second end.

9. The heat exchanger of claim 7, wherein the body portion includes a uniform inside diameter that extends between the first end and the second end.

10. The heat exchanger of claim 7, wherein the body portion defines a longitudinal axis and wherein the first head is attachable to the body portion at a plurality of different orientations with respect to the longitudinal axis.

11. The heat exchanger of claim 7, wherein the first head includes an inlet and an outlet.

12. The heat exchanger of claim 11, further comprising a divider coupled to the first head and cooperating with the first head and the first tube sheet to enclose an inlet space and an outlet space, the inlet space providing fluid communication between the inlet and a first portion of the plurality of tubes, and the outlet space providing fluid communication between the outlet and a second portion of the plurality of tubes.

13. The heat exchanger of claim 12, wherein the second head cooperates with the second tube sheet to define a head space that provides fluid communication between the first plurality of tubes and the second plurality of tubes.

14. The heat exchanger of claim 7, wherein the first head and the second head are each selectively attachable to both the first end and the second end.

15. A heat exchanger for use in cooling a flow of compressed gas with a flow of cooling fluid, the heat exchanger comprising:
  a body portion having a first end, a second end, and a space between the first end and the second end;
  a tube bundle including a first tube sheet, a second tube sheet, and a plurality of tubes extending between the first tube sheet and the second tube sheet, wherein the first and second tube sheets are positioned at opposing ends of the plurality of tubes, the tube bundle positioned within the space, the entire tube bundle movable into and out of an operating position from each of the first end and the second end;
  a first head including an inlet and an outlet, the first head removably connected with a fastener to the first end, such that all portions of the first head are positioned external to the body portion;
  a divider coupled to the first head and cooperating with the first head and the first tube sheet to enclose an inlet space and an outlet space, the inlet space providing fluid communication between the inlet and a first portion of the plurality of tubes, and the outlet space providing fluid communication between the outlet and a second portion of the plurality of tubes;
  a second head removably connected with a fastener to the second end, the second head cooperating with the second tube sheet to define a head space that provides fluid communication between the first plurality of tubes and the second plurality of tubes, such that all portions of the second head are positioned external to the body portion; and
  wherein the first head and the second head completely support the tube bundle within the space such that the tube bundle is held in position without contact of the body portion.

16. The heat exchanger of claim 15, wherein the body portion defines a first length between the first end and the second end, and the tube bundle defines a second length between the first tube sheet and the second tube sheet, the second length being greater than the first length.

17. The heat exchanger of claim 15, further comprising a first seal member positioned between the first tube sheet and the first head to define a first radial seal therebetween and a second seal member positioned between the second tube sheet and the second head to define a second radial seal therebetween.

18. The heat exchanger of claim 15, wherein the body portion defines a longitudinal axis and wherein the first head is attachable to the body portion at a plurality of different orientations with respect to the longitudinal axis.

19. The heat exchanger of claim 15, wherein the tube bundle is insertable into the space from either the first end or the second end.

20. The heat exchanger of claim 15, wherein the body portion defines a uniform inside diameter between the first end and the second end.

21. The heat exchanger of claim 15, wherein the first head and the second head are each selectively attachable to both the first end and the second end.

22. The heat exchanger of claim 1, wherein the first and second tube sheets include an outwardly extending leg engageable with the first and second heads respectively.

23. The heat exchanger of claim 22, wherein one of the first and second heads includes a flange having a rim with a radially inward extension and a portion protruding outward from the rim in an axial direction to form a recess for the leg of the tube sheet to engage therewith.

* * * * *